United States Patent [19]
Van Scoy

[11] 4,394,826
[45] Jul. 26, 1983

[54] ORIFICE METER WITH ISOLATION VALVE ON THE CARRIER

[75] Inventor: Davis A. Van Scoy, Simonton, Tex.

[73] Assignee: Grove Valve and Regulator Company, Oakland, Calif.

[21] Appl. No.: 334,144

[22] Filed: Dec. 24, 1981

[51] Int. Cl.³ .............................................. G01F 1/42
[52] U.S. Cl. .................................. 73/861.61; 138/94.3
[58] Field of Search ............ 73/861.61, 861.62, 432 B; 138/94.3

[56] References Cited

U.S. PATENT DOCUMENTS 2,896,668   7/1959   Aitken ................................. 138/94.3

FOREIGN PATENT DOCUMENTS 3043279   5/1981   Fed. Rep. of Germany ... 73/861.61

Primary Examiner—Herbert Goldstein
Attorney, Agent, or Firm—Melvin R. Stidham

[57] ABSTRACT

An orifice meter with an isolation valve plate pivotally suspended from the bottom of the orifice disc carrier. The valve plate is eccentrically mounted so that it drops to horizontal position when the carrier is raised free of the flow passage sealing surfaces, to seal off an upper chamber into which the disc carrier is raised. When again lowered, the valve plate engages a cam member which cams its back into vertical position nested in a recess along the bottom of the disc carrier.

4 Claims, 1 Drawing Figure

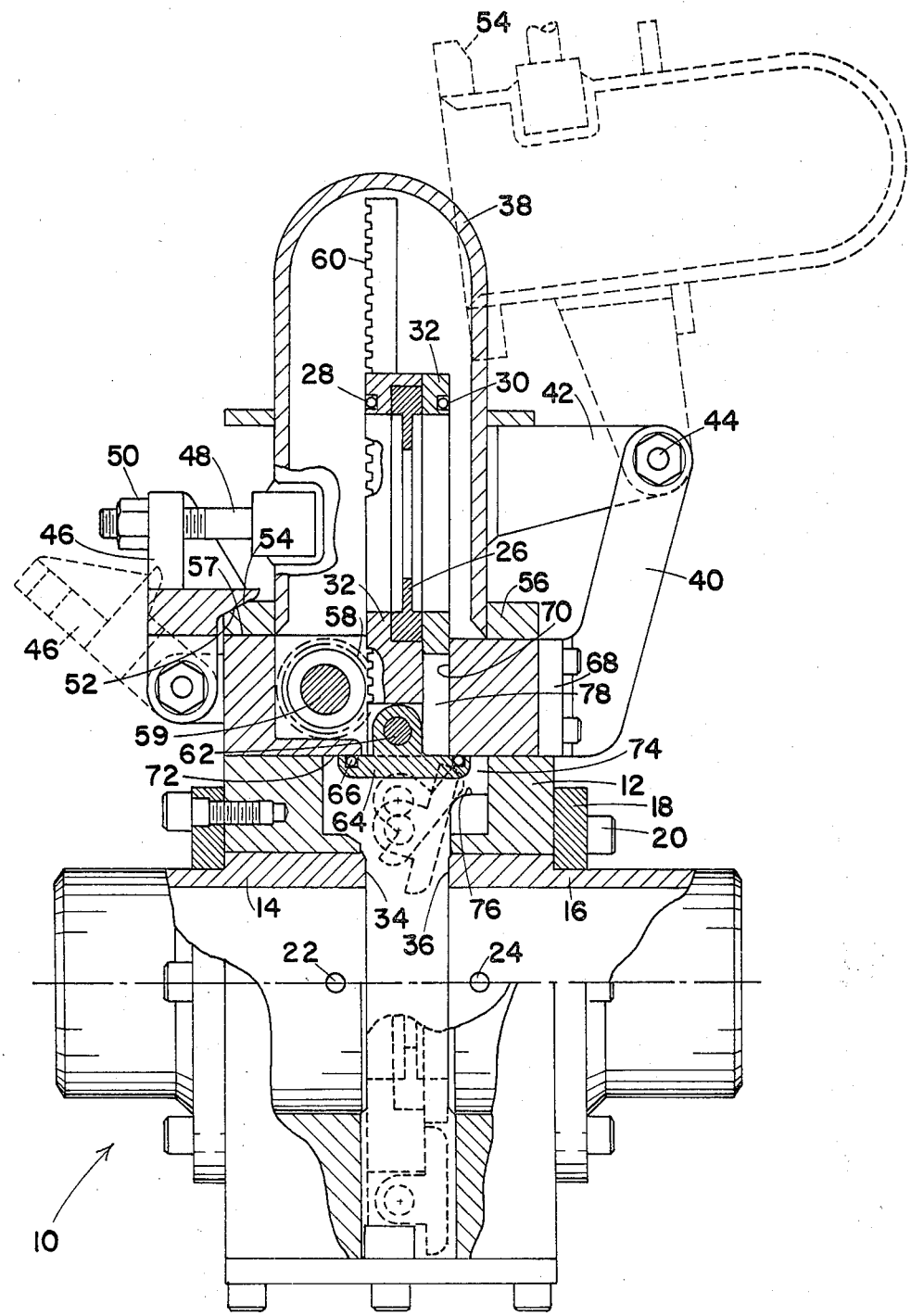

ORIFICE METER WITH ISOLATION VALVE ON THE CARRIER

BACKGROUND OF THE INVENTION

Natural gas is generally sold by volumetric measurement, and one way to measure the volume of a flowing gas is to pass it through an orifice of a known size, and measure the pressure drop across it. An orifice meter comprises a housing within which a disc with an orifice is supported in a gas pipeline, the housing being fitted with pressure taps for measuring pressure immediately upstream and downstream of the orifice. Because the orifice is subject to wear by impacting of sand, line scale, and other foreign particles in the flowing stream, it must be replaced at frequent intervals to insure accuracy in measurement.

In the basic, or junior type orifice meter, the pipeline must be shut down or bypassed while the worn orifice disc is removed from the body and replaced with a new disc. In the more sophisticated or senior type orifice fittings, the orifice disc carrier is moved out of the flow passage to a displaced portion or compartment of the housing, which is then isolated from the flow passage so that flow can continue while the orifice disc is being replaced. If gas flow is continued during the time the orifice disc is being replaced, it is customary to assume a continuing, constant flow rate based on previous measurements. However, with changes in pressure and other variations that can take place in pipeline flow, it highly desirable to minimize the length of the period during which the parties rely on an unmeasured, assumed rate of flow.

OBJECTS OF THE INVENTION

It is an object of this invention to provide an orifice meter wherein an orifice disc may be removed and replaced in a minimum amount of time.

It is a further object of this invention to provide an orifice meter wherein the orifice disc carrier may be moved to position the orifice disc for replacement and at the same time seal around the flow passage to enable continued flow.

It is a further object of this invention to provide an orifice meter wherein the orifice carrier may be moved to carry the orifice disc to an isolation compartment displaced from the flow passage and, at the same time, seal off that displaced compartment from the gas flow in the pipeline.

Other objects and advantages of this invention will become apparent from the description to follow, particularly when read in conjunction with the accompanying drawings.

SUMMARY OF THE INVENTION

In carrying out this invention, there is provided a valve body with a gate-like orifice disc carrier mounted for sliding movement therein to be raised from an active position in line with the flow passages, to a servicing position located in an upper compartment of the valve body. A valve seating surface is provided around the bottom of the compartment or isolation chamber and a flat valve member is pivoted to the bottom of the valve carrier to swing from a generally vertical position in which it normally hangs from the carrier, to a horizontal position in sealing engagement with the bottom of the isolation chamber. This closes off the isolation chamber to enable removal and replacement of the orifice disc while gas flows.

BRIEF DESCRIPTION OF THE DRAWINGS

The drawing is a vertical section view of an orifice meter embodying features of this invention.

DESCRIPTION OF A PREFERRED EMBODIMENT

Referring now to the drawing with greater particularity, the orifice meter 10 of this invention includes a housing 12 to which upstream and downstream flow tubes 14 and 16 carried on flange mountings 18 are bolted, as by means of cap screws 20. The flow tubes 14 and 16 include upstream and downstream taps 22 and 24 from which pressures may be measured in order to determine the pressure drop across an orifice disc 26 when in its lowered active position shown in dotted lines in the drawing. When in such position, seal rings 28 and 30 on both sides of the carrier 32 in which the orifice disc 26 is contained seal against sealing surfaces 34 and 36 on the ends of the upstream and downstream flow tubes 14 and 16 to prevent bypass flow around the carrier 32.

When the carrier is in its raised position shown in solid lines in the drawing, a body closure member 38 may be pivoted up and away from the valve body portion 12 to the position shown in dotted lines in the drawings, wherein the orifice disc 28 is exposed for removal and replacement. Complementary arms 40 and 42 are interconnected by a hinge pin 44 to enable the pivotal movement just described.

Then, when the closure member 38 is pivoted back to position shown in solid lines, a locking lug 46 is pivoted up to engage a bolt 48, which is pivoted on the closure member 38. As the nut 50 is tightened on the bolt 48 a wedge surface 52 slides up a complementary wedge surface 54 on a flange 56 around the closure member 38 to clamp the closure member down firmly against the upper surface 57 of the valve body 12.

The valve carrier 32 is raised and lowered by engagement of a pair of pinions 58, which are keyed to a pinion shaft 59 and engage racks 60 secured along the sides of the carrier 32.

Pivoted at 62 to the bottom of the carrier 32 is a flat valve plate 64 carrying a peripheral resilient seal 66. The valve plate 64 is eccentrically mounted so that it tends to drop down in a clockwise direction as viewed in the drawing, but is normally prevented from doing so by engagement with the sealing surface 36 as the carrier 32 is being raised from the position shown in dotted lines. The housing 68 for the pinions 56 includes a slot 70 through which the carrier 32 passes as it is raised to the position shown in the drawing. Surrounding this slot 70, the bottom surface of the housing 68 is finished to a sealing surface 72. Hence, as the valve plate 64 approaches the sealing surface 72 a clearance 74 is provided to enable the plate 64 to pivot through a clockwise arc enough so that the right edge of the plate 64 engages the sealing surface 72 and continues to pivot the gate as it continues to rise to bring the valve plate 64 and its seal member 66 into firm sealing engagement with the surface 72, thus isolating the interior of the closure member 38 from the gas flowing in the lines 14 and 16. Then, suitable means, (not shown) may be operated to vent the interior of the closure 38 to enable replacement of the orifice disc as previously described.

After the replacement of the disc is completed, and the closure member is sealed shut as described, the pinions 36 are again rotated to lower the carrier 32. After the carrier moves a short distance, the valve plate 64 engages a camming ledge 76 to pivot the valve plate counter-clockwise through an arc, whereby the surface 36 will hold it in its normal suspended position nested in a cavity 78 provided on the orifice disc carrier 32 through further movement thereof to its active position disposed in the flow line.

While this invention has been described in conjunction with a preferred embodiment thereof, it is obvious that modifications and changes therein may be made by those skilled in the art to which it pertains, without departing from the spirit and the scope of this invention as defined by the claims appended hereto.

What is claimed as invention is:

1. An orifice meter comprising:
    a body having a lower main chamber with aligned flow passages therein and an upper service chamber;
    an orifice disc carrier plate movable in said body between said main chamber and said service chamber;
    a downwardly directed, sealing surface around the lower end of said service chamber; and
    an isolation valve plate pivotally suspended from the bottom of said carrier plate;
    an edge of said valve plate being engagable with said sealing surface when said carrier plate is raised to pivot said valve plate into horizontal position to then be moved into sealing engagement with said sealing surface upon further lifting of said carrier plate.

2. The orifice meter defined by claim 1 including:
    means biasing said valve plate toward vertical disposition; and
    a recess along the bottom of said carrier plate to receive said valve plate when displaced from said sealing surface.

3. The orifice meter defined by claim 1 including:
    a cam surface below said sealing surface engagable by said valve plate when said carrier plate is lowered by said sealing surface to enable movement of said carrier plate to said main chamber.

4. The orifice meter defined by claim 2 wherein said biasing means comprises:
    gravity, said valve plate being eccentrically mounted so that one side thereof tends to drop when free of said sealing surface; and
    a cam member below said sealing surface engagable by said one side of the valve plate.

* * * * *